United States Patent [19]

Kramer, Sr. et al.

[11] 4,053,275
[45] Oct. 11, 1977

[54] APPARATUS FOR MAKING FLEXIBLE CORRUGATED RUBBER TUBING

[76] Inventors: Vance M. Kramer, Sr., 402 E. Boundry Road, Perrysburg, Ohio 43551; Vance M. Kramer, Jr., 1913 Greendale Ave., Findlay, Ohio 45840

[21] Appl. No.: 676,281

[22] Filed: Apr. 12, 1976

[51] Int. Cl.² ............................................. B29C 17/04
[52] U.S. Cl. .................................... 425/389; 425/392; 425/396
[58] Field of Search .............. 425/387 R, 387 B, 392, 425/393, 389, 396; 264/313

[56] References Cited

U.S. PATENT DOCUMENTS

| | | | |
|---|---|---|---|
| 2,272,704 | 2/1942 | Harding | 425/387 R X |
| 3,155,757 | 11/1964 | Kramer et al. | 425/393 X |
| 3,304,581 | 2/1967 | Kramer et al. | 425/387 R |
| 3,602,945 | 9/1971 | Pope et al. | 425/503 |
| 3,705,780 | 12/1972 | Kramer et al. | 425/392 X |

*Primary Examiner*—Robert L. Spicer, Jr.
*Attorney, Agent, or Firm*—Bosworth, Sessions & McCoy

[57] ABSTRACT

A method and apparatus for making flexible rubber tubing with axially spaced annular or helical corrugations. A sleeve of uncured vulcanizable rubber is slipped over a forming mandrel and an external form comprising a length of flexible, corrugated, axially compressible rubber tubing is positioned over the sleeve. The interior wall of the external form defines a shaping surface for use in forming embryonic corrugations in the sleeve. The sleeve is radially expanded into the shaping surface and the form and sleeve are axially compressed concertina-fashion to increase the radial dimensions of bulged portions of the sleeve between the corrugations of the external form to make embryonic corrugations in the sleeve. The sleeve and external form are then removed from the forming mandrel and the sleeve is placed on a curing mandrel with the corrugations at desired spacings, after which the sleeve is cured.

9 Claims, 17 Drawing Figures

APPARATUS FOR MAKING FLEXIBLE CORRUGATED RUBBER TUBING

BACKGROUND OF THE INVENTION

This invention relates to the manufacture of flexible rubber tubing with annular or helical corrugations. More particularly, the invention relates to a unique variation of the method and apparatus for the manufacture of such tubing in accordance with U.S. Pat Nos. 3,168,604, 3,304,581, 3,669,586 and/or 3,705,780, and especially to a variation thereof that is particularly advantageous in the manufacture of corrugated tubing with relatively thin walls, for example, with a wall thickness of around 0.04 in. For the purpose of this specification, the expression "circumferential" will be used to include both annular and helical convolutions.

As disclosed in U.S. Pat. Nos. 3,168,604, 3,304,581, 3,669,586 and 3,705,780, corrugated tubing with annular or helical corrugations may be made with external forming devices including axially spaced annular discs or helices that are employed with forming mandrels and air pressure means to produce embryonic corrugations in uncured rubber sleeves. Each time a tube is formed, the external forming device is placed over a forming mandrel (coated with a lubricant such as a silicone composition) on which a sleeve has been positioned, both the internal and external surfaces of the sleeve being supplied with a lubricant such as a silicone composition, and the sleeve is radially expanded so that it bulges into the spaces between the discs or turns of the helix to form creases between the bulges.

According to the aforesaid patents, the forming member and sleeve are then collapsed axially so that the sleeve is axially compressed, concertina-fashion. The creases together with adjacent bulges provide embryonic corrugations. Then the forming member is axially extended together with the sleeve after which the sleeve is removed from the forming mandrel and from within the forming member and placed on a cylindrical curing mandrel where it is axially foreshortened, concertina-fashion into a corrugated form with the desired spacing between adjacent annular or helical corrugations. The curing mandrel with the sleeve on it is then placed in an oven to cure the sleeve and set the corrugations.

The method and apparatus thus described have been used to produce flexible tubing of both circular and non-circular cross sectional form with either annular or helical corrugations. Such tubing is used to great advantage in many and various applications.

It will be apparent from the foregoing patents that the external forming member used to form the embryonic corrugations requires fabrication by skilled workers who must, in some instances, fabricate and weld the various parts together in an operation that may take several hours. Because many different sizes of tubing must be made, the fabrication of the forming members is a major factor in the overall cost of the tubing.

Also, since the external forming members of the prior art patents discussed above utilize metal parts with narrow edges that come into contact with the uncured rubber sleeve, a limitation is imposed on the wall thickness of the uncured rubber sleeves that may be used. The wall thickness and rubber hardness must be sufficient to resist cutting and penetration by the edges of the forming member during the operation of forming the embryonic corrugations and separating the forming member and the uncured sleeve. As a result of this, the aforesaid method and apparatus have been limited as to the thinness of the walls of tubing that can be manufactured. While greater wall thicknesses are desired for many applications, there are some instances where unusually small wall thicknesses are required--such as, for example, where the tubing is a throw-away type product where minimal cost is an important consideration. An example of such tubing is flexible tubing for gas connections used in medical applications.

The method and apparatus of the present invention, however, resolve the difficulties indicated above and afford other features and advantages heretofore not obtainable.

SUMMARY OF THE INVENTION

A general object of the present invention is to provide an improved apparatus and method for the manufacture of flexible tubing with axially spaced annular or helical corrugations.

Another object is to provide improved flexible corrugated tubing.

Still another object is to reduce the time and expense required to make external forms to be used in the manufacture of flexible corrugated tubing.

Other objects are to provide a simpler and more economical method and apparatus for manufacturing such tubing which can be particularly adapted to the manufacture of tubing with relatively thin walls.

These and other objects are achieved by a variation of, or improvement upon the method and apparatus of the prior art patents discussed above for making flexible corrugated tubing from an extruded sleeve of uncured rubber.

The apparatus of the invention includes a forming mandrel adapted to receive the sleeve and means for applying air under pressure to the interior of the sleeve for radially expanding it. In accordance with the improvement of the invention the external form that is positioned over the sleeve comprises an axially extensible tubular forming member formed of elastomeric material and having a plurality of circumferential corrugations formed intermediate its ends that permit its axial compression and elongation concertina-fashion. The internal dimensions of the forming member substantially correspond to the external dimensions of the tubing to be produced. When The sleeve is radially expanded by air pressure, portions thereof bulge into the spaces between the corrugations in the external forming member and embryonic corrugations are formed in the sleeve. Usually, the external form is axially compressed while the sleeve is expanded to assist in forming the embryonic corrugations. In some instances, however, the axial compression may not be necessary.

Accordingly, the method of the invention comprises positioning a sleeve of uncured rubber on a lubricated forming mandrel of the type described, thereafter positioning a length of flexible corrugated tubing formed of elastomeric material over the sleeve which is likewise lubricated and expanding the sleeve radially into engagement with the interior surface of the external form. The expansion of the sleeve forms embryonic corrugations therein. Then, in most cases, the external form is axially compressed concertina-fashion, to accentuate the embryonic corrugations formed in the sleeve by the expansion thereof. In some instances, however, the axial compression may not be necessary. The sleeve and external form are then axially extended, the sleeve is pulled out of the forming member and the sleeve and the forming member are removed from the forming mandrel. The sleeve as thus formed is placed on a curing mandrel with its corrugations at a desired spacing, and cured in an oven to set the corrugations. The forming member may be used to form corrugations in additional sleeves.

DESCRIPTION OF THE PREFERRED EMBODIMENT

Figure 1:
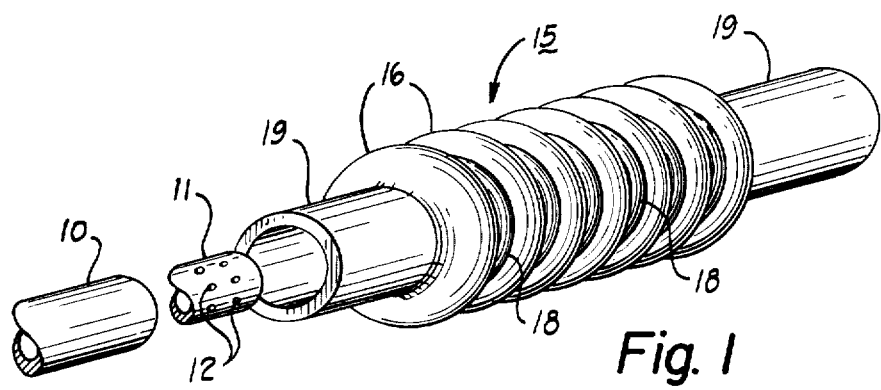
FIG. 1 is an exploded perspective view with parts broken away, of an apparatus for use in forming a length of corrugated tubing from an uncured rubber sleeve.
Figure 2:
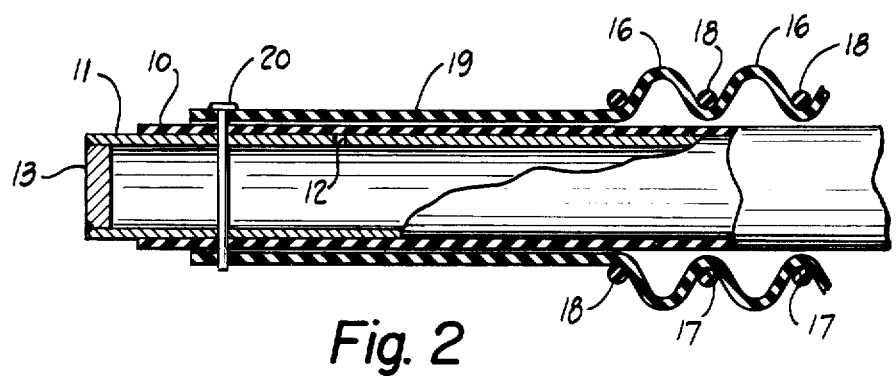
FIGS. 2 through 5 are sequential fragmentary sectional views with parts broken away of an apparatus for use in making flexible corrugated tubing from an uncured rubber sleeve using the apparatus of FIG. 1, and illustrating the sequential steps in practicing that portion of the method wherein embryonic corrugations are formed in a sleeve of uncured rubber.

Referring more particularly to the drawings and initially to FIGS. 1 to 5, there is shown an apparatus for use in making from an extruded sleeve 10 of uncured rubber, a length of flexible tubing having at least portions thereof formed with helical or annular corrugations. The extruded sleeve 10 is of the desired size for forming the particular corrugated tubing to be manufactured, and is initially placed on a forming mandrel 11 that is connected at one end to a pressure supply means (not shown). The mandrel is supported as a cantilever from the same end by a suitable support (not shown). The mandrel 11 is initially coated with a lubricant such as a silicone composition which may be applied to the exterior of the mandrel by the sleeve, both the interior and exterior surfaces of which may be lubricated by immersing the sleeve in a bath containing the desired lubricant. The mandrel has a plurality of radial ports 12 formed therein and an end plug 13 at one end (Fig. 2).

Figure 3:
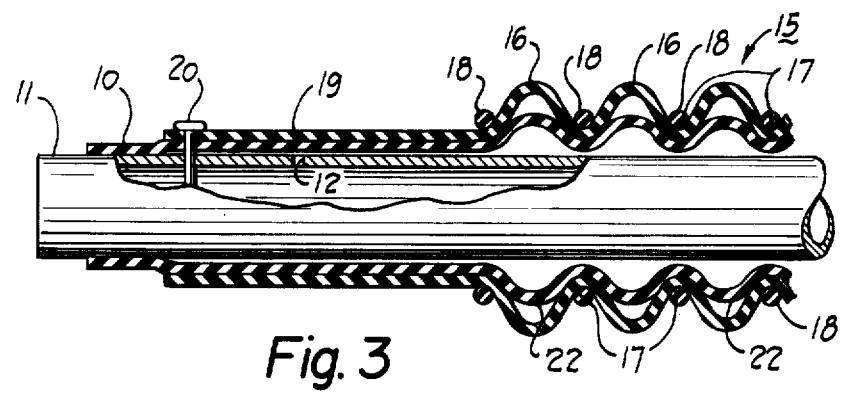

The lubricant-coated sleeve 10 is disposed on the mandrel 11 and an external form 15 embodying the invention is positioned over the mandrel and sleeve in the manner illustrated in FIG. 2. The external form 15 is used to provide the desired preliminary shaping of the sleeve 10, i.e., to form embryonic corrugations therein as accomplished in a manner similar to the general method of U.S. Pat. Nos. 3,168,604, 3,304,581 and/or 3,669,586. The external form 15 has a generally corrugated shape defined by annular ridges 16 with annular grooves 17 therebetween. Rubber reinforcing rings 18 formed of relatively hard rubber are positioned in the grooves 17 between the ridges 16 for reinforcing purposes as will be described below. A typical method of making the external form 15 is described below in connection with FIGS. 10 through 15. The end portions 19 of the external form 15 extend axially beyond the corrugated portion and one end may be retained by a pin 20 as illustrated in FIGS. 2 and 3.

Once the sleeve 10 and external form 15 have been assembled as illustrated in FIG. 2, air under pressure is supplied through the forming mandrel 11 and air flows through the radial ports 12 to the space between the sleeve 10 and the outer surface of the mandrel 11. Normally, an operator presses the ends of the sleeve 10 against the mandrel to seal the ends of the sleeve and prevent or at least restrict the escape of air. The fluid pressure inflates the sleeve 10 and annular bulges 22 are formed in the spaces between the grooves 17 as illustrated in FIG. 3.

Figure 4:
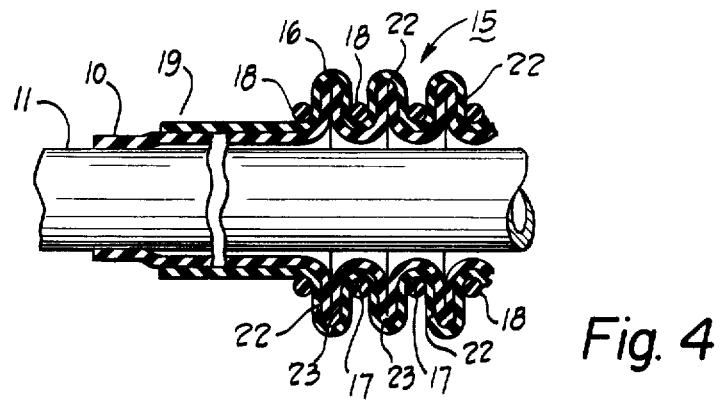
Figure 5:
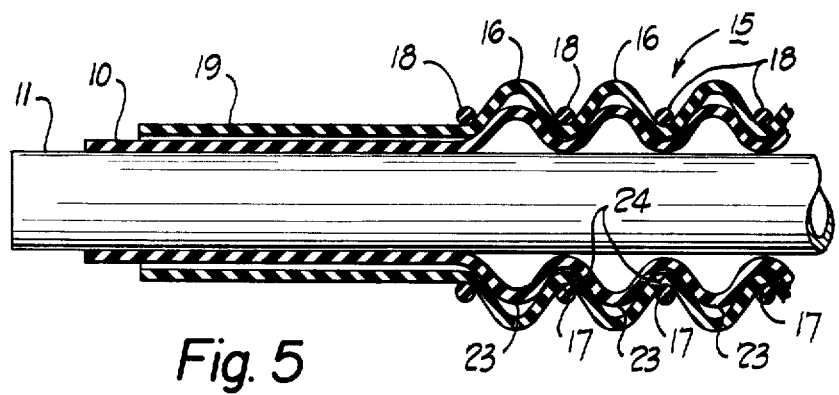

With the assembly in this condition, the air supply is cut off and the external form in most instances is axially compressed concertina-fashion as illustrated in FIG. 4 so that the annular bulges 22 extend between adjacent grooved 17 resulting in increasing the radial dimensions and reducing the axial dimensions of the bulges 22 in the uncured rubber sleeve 10. As indicated in FIG. 4 there are annular ridges 23 at the peaks of the bulges and rounded annular creases 24 between the bulges. While the form is shown in FIG. 4 as being compressed until the inner surfaces of the sidewalls of the bulges 22 touch each other, in many instances this degree of compression will not be necessary, the embryonic corrugations being sufficiently formed with a lesser amount of compression, or in some instances no compression at all. This depends on the wall thickness and characteristics of the material. The operator can readily determine the amount of compression necessary for sleeves of a given type by starting out by fully compressing the first sleeve as shown in FIG. 4 and then reducing the degree of compression of successive sleeves of the same type until a point is reached where the embryonic corrugations are not sufficiently formed whereupon the degree of compression is increased enough to obtain satisfactory results. Reducing the degree of compression has the principal advantage of speeding up the operation and reducing the effort required of the operator.

After this step is accomplished, the form 15 and sleeve 10 are axially elongated as necessary (FIG. 5) and the external form 15 is removed from the sleeve 10 by pulling one end of either the sleeve or the form. The extension of the sleeve 10 reduces the diameter of the bulges 22 sufficiently to permit the external form 15 to be removed from the sleeve 10 and mandrel 11.

Figure 6:
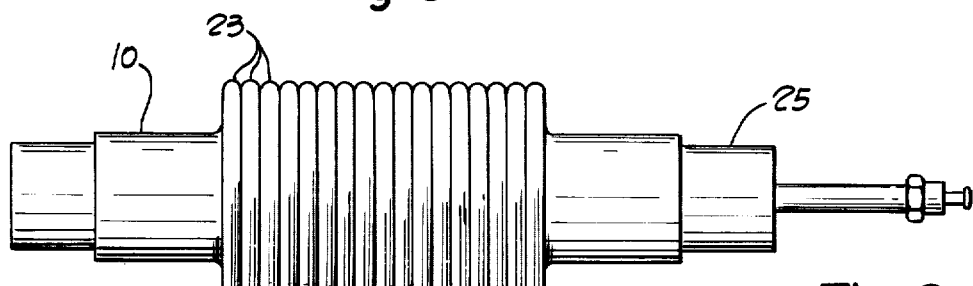
FIG. 6 is an elevational view illustrating an uncured rubber sleeve with embryonic corrugations formed therein positioned on a curing mandrel prior to curing in an oven to set the corrugations.
Figures 7, 8, 9:
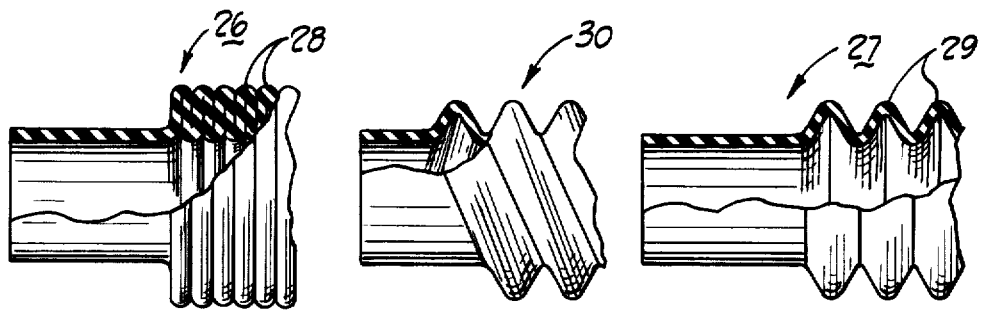
FIGS. 7, 8 and 9 are fragmentary side elevations partly in section showing lengths of flexible corrugated rubber tubing made in accordance with the method of the invention.

The impressed sleeve is then removed from the forming mandrel 11 and placed on a curing mandrel 25 (FIG. 6) where the length of the portion of the sleeve 10 formed with the embryonic corrugations is reduced to produce annular corrugations that may be closely spaced as illustrated in FIG. 7 or more widely spaced as illustrated in FIG. 8.

FIGS. 7 and 8 illustrate portions of two types of corrugated tubing embodying the invention identified by the numerals 26 and 27 made in accordance with the method of FIGS. 1 to 6. The cured rubber tube 26 is provided with closely spaced annular corrugations 28 and the tube 27 is provided with more widely spaced annular corrugations 29. FIG. 9 illustrates still another type of corrugated tubing 30 embodying the invention and made substantially in accordance with the method of FIGS. 1 to 6 but having helical corrugations. The tubes 26, 27 and 30 all have a uniform wall thickness throughout their length, are relatively flexible and can be axially elongated to well beyond their natural or collapsed length.

FIGS. 10 through 15 show a typical method and means for fabricating the external form 15 of the invention.

Figure 10:
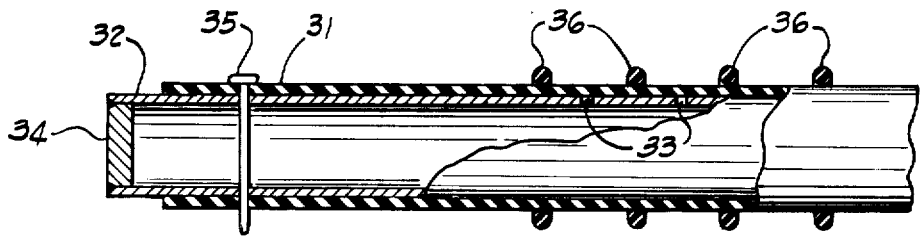
FIGS. 10 through 14 are fragmentary sectional views with parts broken away illustrating the sequential steps in making an external form embodying the apparatus of the invention.
Figure 11:
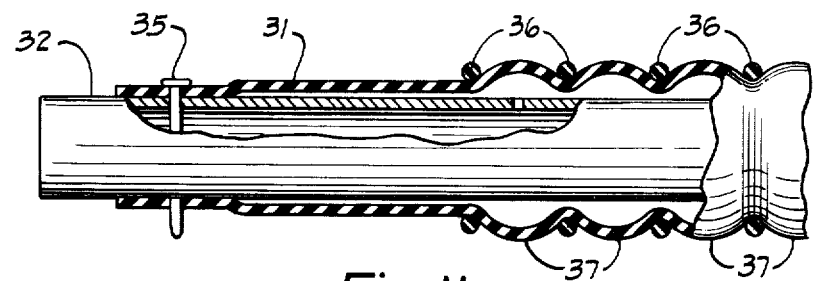

In accordance with FIGS. 10 to 14, the external form is fabricated from an extruded uncured rubber sleeve 31 of a desired diameter, which is such that the internal diameter of the resulting form 15 will be slightly greater than the external diameter of the sleeve 10 of uncured rubber to be shaped. The sleeve 31 is placed on a mandrel 32 having radial ports 33 and an end plug 34 generally in the same manner as the forming mandrel 11. The sleeve 31 is secured in place using a pin 35. Also, a plurality of annular reinforcing rings 36 are placed on the sleeve at uniformly spaced locations as illustrated in FIG. 10.

Figure 12:
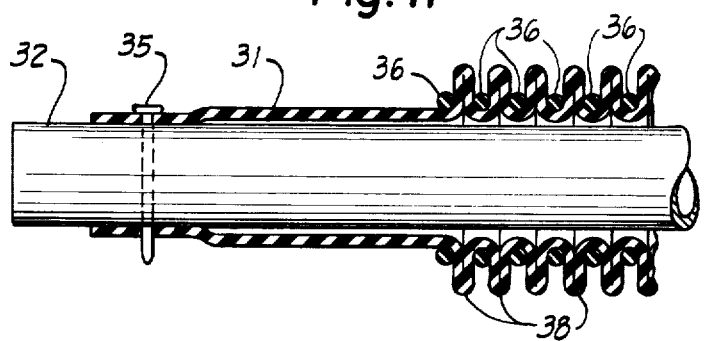
Figure 13:
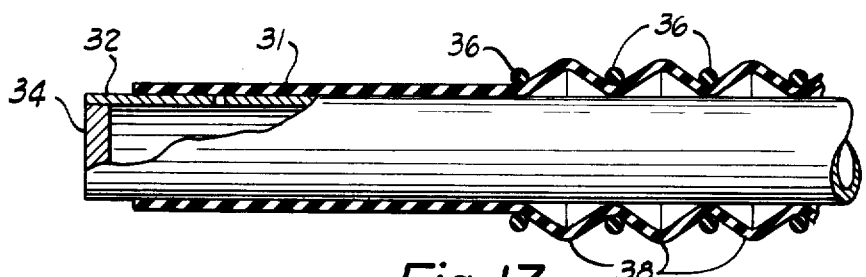

Then air under pressure is supplied to the interior of the forming mandrel 32 and through the ports 33 to the space between the sleeve 31 and outer surface of the mandrel 32. Normally, an operator presses the ends of the sleeve 31 against the mandrel to seal the ends of the sleeve and prevent or at least restrict the escape of air. This forms annular bulges 37 (FIG. 11) between the reinforcing rings 36. In this condition, the sleeve 31 is axially collapsed concertina-fashion as illustrated in FIG. 12 to form corrugations 38 between the reinforcing rings 36. Then the sleeve 31 may be axially elongated as illustrated in FIG. 13 and is removed from the forming mandrel 32.

Figure 14:
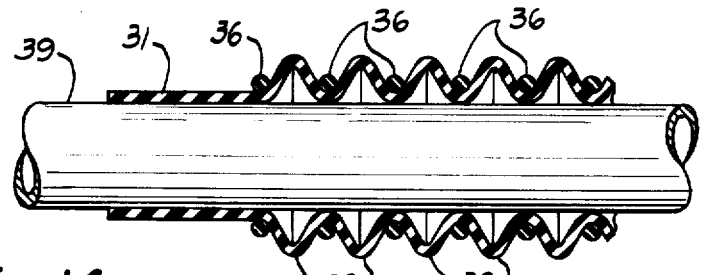

Next, the sleeve 31 with the corrugations 38 formed therein is placed on a curing mandrel 39 as illustrated in FIG. 14 and the spacing between the rings 36 is adjusted to provide the desired spacing between corrugations. The product is then cured and the fabrication of the external form 15 is complete.

Figure 15:
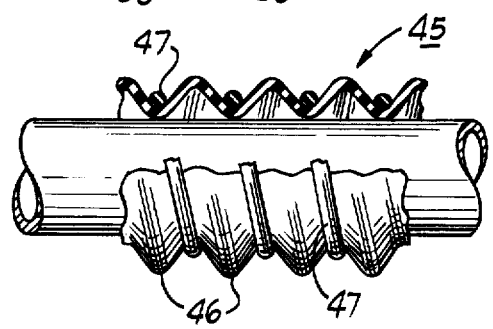
FIG. 15 is a fragmentary side elevation with parts broken away illustrating an alternate type of external form embodying the apparatus of the invention.

FIG. 15 illustrates a modified type of external form 45 wherein the corrugations 46 are helical and wherein the reinforcement between the corrugations is in the form of a helically wrapped length 47 of reinforcing rubber which, when the product is cured, performs the same function as the rings 36 of the embodiment of FIGS. 10 to 14.

Where the external form is not provided with special reinforcing means it may be made in accordance with the method of U.S. Pat. Nos. 3,168,604, 3,304,581 and/or 3,669,586.

While reinforcing rings 36 or convolutions 47 have been used in the external forms illustrated and described herein, such reinforcement may not be necessary in instances in which the strength of the external form may be sufficient without additional reinforcement. Also, reinforcement may be provided by metal rings or in other ways that suit the circumstances. As described above, the form may be adapted to provide either annular or helical embryonic corrugations in the sleeve. Also, the resulting sleeve may be used to produce tubing with either circular or non-circular cross sectional form.

Figure 16:
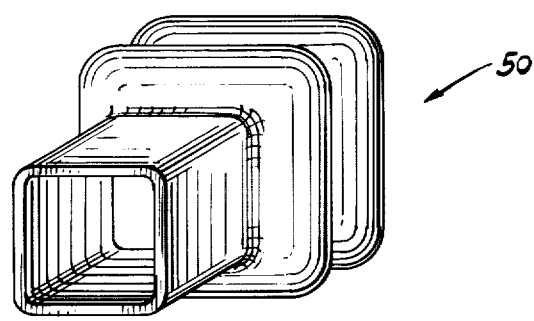
FIGS. 16 and 17 illustrate lengths of flexible corrugated rubber tubing of non-circular cross sectional shape made in accordance with the method of the invention.
Figure 17:
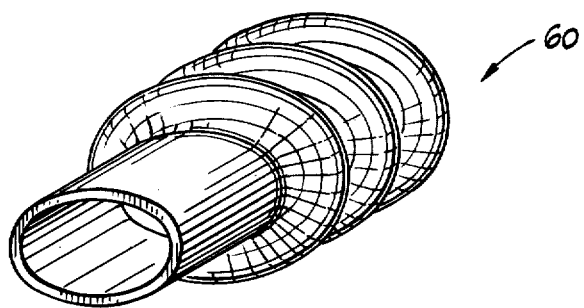

FIGS. 16 and 17 illustrate other types of corrugated tubing embodying the invention and made in accordance with the method of FIGS. 1 to 6. The corrugated tubing 50 of FIG. 16 has a generally rectangular cross sectional form with annular corrugations and the corrugated tubing 60 of FIG. 17 has an oval cross sectional form with annular corrugations. The lengths 50 and 60 may be made, for example, in accordance with the method of copending U.S. patent application Ser. No. 497,843 filed July 3, 1975 now U.S. Pat. No. 3,975,125 dated Aug. 17, 1976. Also, the invention has utility in connection with other plastic compositions as well as rubber.

While the invention has been shown and described with respect to specific embodiments hereof, this is intended for the purpose of illustration rather than limitation and other variations and modifications of the specific method and apparatus herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

We claim

1. In apparatus for making flexible corrugated tubing from an extruded sleeve of uncured rubber and including a forming mandrel adapted to receive said sleeve and means for supplying air under pressure to the interior of said sleeve for radially expanding said sleeve, the improvement which comprises:

an axially extensible external form adapted to be disposed over said mandrel and sleeve, said form comprising a tubular cylindrical member formed of elastomeric material and having a plurality of circumferential corrugations formed intermediate its ends whereby when said sleeve is radially expanded by said air pressure supplying means, said sleeve is bulged outwardly against said external form so that the exterior surface of said sleeve conforms to the surface of said external form and embryonic corrugations are formed in said sleeve, said embryonic corrugations corresponding generally in axial spacing and radial depth to the corrugations in said external form when in its unextended relaxed condition.

2. Apparatus as defined in claim 1 wherein said corrugations are annular.

3. Apparatus as defined in claim 2 wherein said corrugations have axially spaced annular groove portions and wherein an annular reinforcing element is positioned in each of said grooves to restrict radial expansion of said annular groove portions.

4. Apparatus as defined in claim 3 wherein said reinforcing elements comprise rubber rings.

5. Apparatus as defined in claim 4 wherein said rubber rings comprise a hard, relatively inextensible rubber.

6. Apparatus as defined in claim 3 wherein said reinforcing elements comprise metal rings.

7. Apparatus as defined in claim 1 wherein said corrugations are helical.

8. Apparatus as defined in claim 7 wherein said helical corrugations have a helical groove comprising a plurality of convolutions and wherein a reinforcing element is positioned in said groove and extends in helical convolutions corresponding to the convolutions of said groove.

9. Apparatus as defined in claim 8 wherein said reinforcing element comprises a relatively hard inextensible rubber.

* * * * *